the term of this the case when the time domain.

United States Patent
Clark

(10) Patent No.: US 7,212,569 B1
(45) Date of Patent: May 1, 2007

(54) FREQUENCY DOMAIN DECISION FEEDBACK EQUALIZER

(75) Inventor: Martin Vivian Clark, Boston, MA (US)

(73) Assignee: AT&T Corp., New York, NY (US)

( * ) Notice: Subject to any disclaimer, the term of this patent is extended or adjusted under 35 U.S.C. 154(b) by 779 days.

(21) Appl. No.: 10/411,684

(22) Filed: Apr. 11, 2003

Related U.S. Application Data

(60) Provisional application No. 60/392,876, filed on Jun. 28, 2002.

(51) Int. Cl.
*H03H 7/30* (2006.01)
*H03K 5/159* (2006.01)
*H04B 1/10* (2006.01)

(52) U.S. Cl. ................................ 375/233; 375/350
(58) Field of Classification Search ................ 375/229, 375/230, 232, 233, 346, 350
See application file for complete search history.

(56) References Cited

U.S. PATENT DOCUMENTS

| | | | | |
|---|---|---|---|---|
| 6,912,258 B2 * | 6/2005 | Birru | ........................... | 375/340 |
| 7,012,957 B2 * | 3/2006 | Allpress et al. | ............. | 375/233 |
| 7,054,354 B2 * | 5/2006 | Gorokhov et al. | .......... | 375/148 |
| 7,075,967 B2 * | 7/2006 | Struhsaker et al. | ......... | 375/130 |
| 2002/0106040 A1 * | 8/2002 | Malkemes et al. | .......... | 375/347 |
| 2003/0231709 A1 * | 12/2003 | Pare et al. | ................... | 375/233 |

OTHER PUBLICATIONS

K. Berberidis and J. Palicot, "A Frequency-Domain decision Feedback Equalizer For Multipath Echo Cancellation," *IEEE Proc. Globecom '95*, Singapore, Dec. 1995, pp. 98-102.
D. Falconer and S. L. Ariyavisitakul, "Frequency Domain Equalization For 2-11 GHZ Broadband Wireless Systems," IEEE 802.16 Open Forum Tutorial, Jan. 2001, pp. 1-36.

* cited by examiner

*Primary Examiner*—Jay K. Patel
*Assistant Examiner*—David B. Lugo
(74) *Attorney, Agent, or Firm*—Ronald D. Slusky

(57) ABSTRACT

The feedback structure of a frequency domain decision feedback equalizer is implemented in the frequency domain, rather than in the time domain. Advantageously, this permits the synthesis of long feedback filters with a much smaller increase in receiver complexity than is the case when the feedback structure is illustratively implemented in the time domain. Adaptation of the characteristics of the feedback structure of the frequency domain equalizer (as well as its feedforward structure) is carried out based on tentative symbol decisions that are fed back on a block basis. Although possibly rendering the receiver more susceptible to channel estimation errors, this approach renders the receiver capable not only of the post-cursor intersymbol interference cancellation afforded by a standard DFE, but pre-cursor intersymbol interference cancellation, as well, helping to offset any impact of increased channel estimation errors.

12 Claims, 2 Drawing Sheets

FREQUENCY DOMAIN DECISION FEEDBACK EQUALIZER

CROSS-REFERENCE TO RELATED APPLICATION

This application claims the benefit of U.S. provisional application No. 60/392,876 entitled "Frequency Domain Decision Feedback Equalizer" filed on Jun. 28, 2002.

BACKGROUND OF THE INVENTION

The present invention relates to equalizers used in, for example, data transmission systems to compensate for the effects of intersymbol interference in the received signal.

A fundamental challenge in transmitting a data signal over a wireless channel is to overcome the time-dispersive signal distortion caused by multipath propagation. Consider a multipath channel with a delay span—or delay spread—of $\tau_s$ microseconds, i.e., the span over which multipath components are received above the thermal noise floor. The channel dispersion thus spans $L=R\tau_s$ data symbols, where R is the data signaling rate in Mbaud. Roughly speaking, a value of L greater than unity, or perhaps less, will tend to introduce problematic intersymbol interference (ISI) in the detection process.

A variety of solutions are available to meet the demand for increasingly higher data rates in wireless communication systems in light of the multipath dispersion problem. These can be grouped into three general categories: 1) avoid large delay spreads, $\tau_s$; 2) avoid large signaling rates, R; 3) accept both large $\tau_s$ and large R, but mitigate the resultant impact of multipath dispersion.

The first solution category involves limiting propagation distances and differential path delays by employing small cells, cell-sectorization, or beam-forming. For example, WLANs (wireless local area networks) based on the IEEE 802.11b standard are designed to operate indoors, where $\tau_s$ tends to be less than 100 ns. Such small delay spreads allow data rates up to 11 Mb/s (the highest rate of 802.11b) with little or no ISI-mitigation required.

The second category of solutions includes "orthogonal multiplexing," which involves demultiplexing a high data-rate signal, with data rate $R_T$, onto $N_c$ orthogonal sub-channels, each with a signaling rate $R=R_T/N_c$ that is sufficiently small to avoid ISI (i.e., narrowband sub-channels or, effectively, long data symbols). Examples of this general concept are multicarrier modulation or multiple-input multiple-output (MIMO) antenna systems. MIMO systems have the added advantage of increased data rates without requiring large radio bandwidths. Moreover, equalization techniques can be combined with MIMO to allow greater signaling rates in each sub-channel. One important implementation is OFDM (orthogonal frequency division multiplexing), which is used in the IEEE 802.11a standard for WLANs, and also included in the draft standard IEEE 802.16 for WMANs (wireless metropolitan area networks).

The third category includes many possible solutions, but they are generally referred to as types of wideband single-carrier transmission with equalization. There are two key advantages of wideband single-carrier transmission. First, the energy of each data symbol is effectively spread over all frequencies within the signal band, which offers an inherent frequency diversity (or "multipath diversity"). In contrast, the narrowband signals in the first two categories above are inherently vulnerable to frequency-flat fading, and so interleaving and coding are usually required. Second, the modulation properties of single-carrier transmission—e.g., peak power and signal constellation (and also its associated coding)—can easily be controlled. In a channel with a relatively small path loss, for example, a large signal constellation (e.g., 16-QAM or higher) could be employed to allow high bit rates; and in a channel with a large path loss, coding or a small constellation—such as a two-symbol, biphase shift keying (BPSK) constellation or a four-symbol, quadrature phase shift keying (QPSK) constellation—could be employed to ensure reliable communication. Such an adaptive modulation scheme requires minimal feedback from the receiver. In orthogonal multiplexing schemes, on the other hand, a bank of somewhat independent modulators needs to be controlled and so more feedback is generally required, especially in frequency-division duplex links. Moreover, multicarrier modulation transmission tends to exhibit a higher peak-to-average power ratio than single-carrier transmission does, and so its transmit power generally needs to be backed off, to some degree, to control peak power and avoid transmit amplifier clipping.

The catch with single-carrier transmission is that it requires adequate equalization, or ISI mitigation, in multipath-dispersive channels. Conceptually, the most basic type of equalizer is linear—it convolves the received signal with a filter response that attempts to undo the convolution imposed by the multipath channel. The fundamental problem with linear equalization (LE), however, is that it cannot both eliminate ISI and provide optimal noise suppression with the same receive filter.

An improved structure in this regard is the decision feedback equalizer (DFE), which comprises both a receive ("forward") filter and a feedback filter, whereby detected data symbols are convolved with the feedback filter response to effect ISI-cancellation. In this way, the forward filter can focus less on equalization, and more on noise suppression. It can be shown that the Shannon capacity of a single-carrier transmission link with an idealized decision-feedback equalizer (infinite-length optimal filters, and no error propagation) is equal to that of idealized multicarrier modulation (assuming equal power across the signal band). That is, given some specified schemes for adaptive modulation and error-correction coding, one would expect the performance and throughput of a decision-feedback equalizer in a single-carrier transmission system to be similar to that of multicarrier modulation with adaptive modulation/coding in each tone. The key difference is that single-carrier transmission can, in general, achieve that performance and throughput with less feedback from the receiver to the transmitter.

A conventional implementation of either linear equalization or decision-feedback equalization employs transversal filters, or tapped delay lines. The length, N, of such a filter is usually linearly proportional to the maximum value of L for which the equalizer is designed. The complexity per received symbol thus grows with N, or even with $N^2$ for some adaptive equalizer implementations. Time-domain equalizer designs are thus becoming less attractive, or prohibitively complex, in applications that are seeing increasingly large values of L, e.g., in broadband wireless data networks.

An alternative is frequency-domain equalization (FDE), which is based on the concept of fast convolution. Fast convolution of a signal with some desired filter response involves a) transforming the signal into the frequency domain, via the FFT (fast Fourier transform); b) multiplying the transformed signal with the filter's frequency response;

and c) transforming the resultant signal back into the time-domain, via the IFFT (inverse FFT). It also usually involves breaking the input signal into manageable blocks of length N symbols, where N is usually some power of two greater than the filter length. This, in turn, may call for block-overlap procedures at the IFFT output. Whatever the case, the complexity per output sample of this FFT-based convolution grows logarithmically with N, a modest growth compared with the linear growth of time-domain convolution. It turns out that for $N \geq 32$ this kind of frequency-domain filtering is generally a more attractive option than its time-domain counterpart.

The concept of frequency domain equalization—for the purpose of combating time dispersion—is almost 30 years old. It has found little application over that time, however, because most practical communication links exhibited limited dispersion, and so time-domain equalizers were adequate. Moreover, practical limitations of digital signal processing technology have, in the past, made large FFTs infeasible. More recently, however, demand for high-speed wireless data applications and advances in DSP/ASIC technology have stimulated new interest in frequency-domain equalization. In March 2001, both single-carrier transmission and OFDM modes were accepted in the IEEE 802.16 draft standard for fixed broadband wireless systems, where the single-carrier transmission mode has been designed to work with frequency-domain equalization. Either mode breaks the transmitted data stream into blocks of length N symbols and appends to each block a cyclic prefix, whereby N and the prefix length are chosen to be at least as large as the expected maximum value of the dispersion span, L. The prefix ensures that the corresponding received signal blocks appear to have a periodic property, which is essential for OFDM to operate and also allows single-carrier transmission with frequency-domain equalization to operate without the need for block overlap methods (which increase complexity).

In principle, the complexities of OFDM and single-carrier transmission-frequency-domain equalization are comparable (they both grow logarithmically with N), and the operating mode selected would likely depend on channel conditions. For example, single-carrier transmission-frequency-domain equalization may be preferred over OFDM in high path loss channels for which a small modulation constellation and large peak power are preferred to ensure reliable communication.

Most work on frequency-domain equalization over the years has analyzed linear structures. However, in the development of the 802.16 standard, a receiver was proposed by Falconer et al in "Frequency domain equalization for 2–11 GHz broadband wireless systems," IEEE 802.16 *Open Forum Tutorials*, January 2001 that included a time-domain decision-feedback equalizer interworking with a linear frequency-domain equalizer, this combination being referred to as a frequency-domain decision-feedback equalizer (frequency domain DFE).

An equalization arrangement in which both the linear and decision feedback equalizers are realized in the frequency domain is disclosed in K. Berberidis and J. Palicot, "A frequency domain decision feedback equalizer for multipath echo cancellation," *Proc. Globecom '95*, Singapore, December 1995, pp. 98–102. Such an approach permits the synthesis of long feedback filters with a much smaller increase in receiver complexity than is the case when the feedback structure is implemented in the time domain. The frequency domain outputs of the linear and decision feedback equalizers are each converted back into the time domain, whereupon they are combined and decisions as to the transmitted symbols are formed in response to the combined signal. The decisions thus formed are used not only as a final output, but also as the decisions fed back (after being first transformed into the frequency domain) to the decision feedback equalizer. A least mean squared algorithm is used to adapt, or update, the responses of the linear and decision feedback equalizers.

SUMMARY OF THE INVENTION

The present invention is directed to an equalization arrangement in which, like the arrangement disclosed by Berberidis et al., both the linear and decision feedback equalizers are realized in the frequency domain. In accordance with the principles of the present invention, however, final decisions are not generated directly from the linear equalizer output. Rather, the output of the linear equalizer is used to form tentative decisions that are used as the decision inputs to the decision feedback equalizer. With this approach, all of the ISI cancellation is performed by the decision feedback equalizer. ISI pre-cursors are nonetheless cancelled with this approach because the decision feedback equalizer has knowledge of not only past decisions (for post-cursor cancellation) but also "future" decisions. These are available because of the tentative decisions generated in response to the output of the linear equalizer. In effect, each received block is processed twice, thereby providing enhanced ISI cancellation.

Embodiments of the invention may advantageously include channel-matched filtering prior to linear equalization processing, thereby enhancing the input signal's signal-to-noise ratio and thereby enhancing the effectiveness of the ISI cancellation carried out by the decision-feedback equalizer.

Embodiments of the invention may advantageously generate an estimate of the characteristics of the channel traversed by the received signal and that estimate may then be used to update parameters used to carry out at least one of the a) channel-matching filtering, b) linear equalization and c) decision feedback equalization. This approach is expected to provide better ISI cancellation and to allow the system to converge more quickly than if the updating were based on, for example, a least mean squares algorithm.

DETAILED DESCRIPTION OF AN ILLUSTRATIVE EMBODIMENT

System Block Diagram

Figure 1:
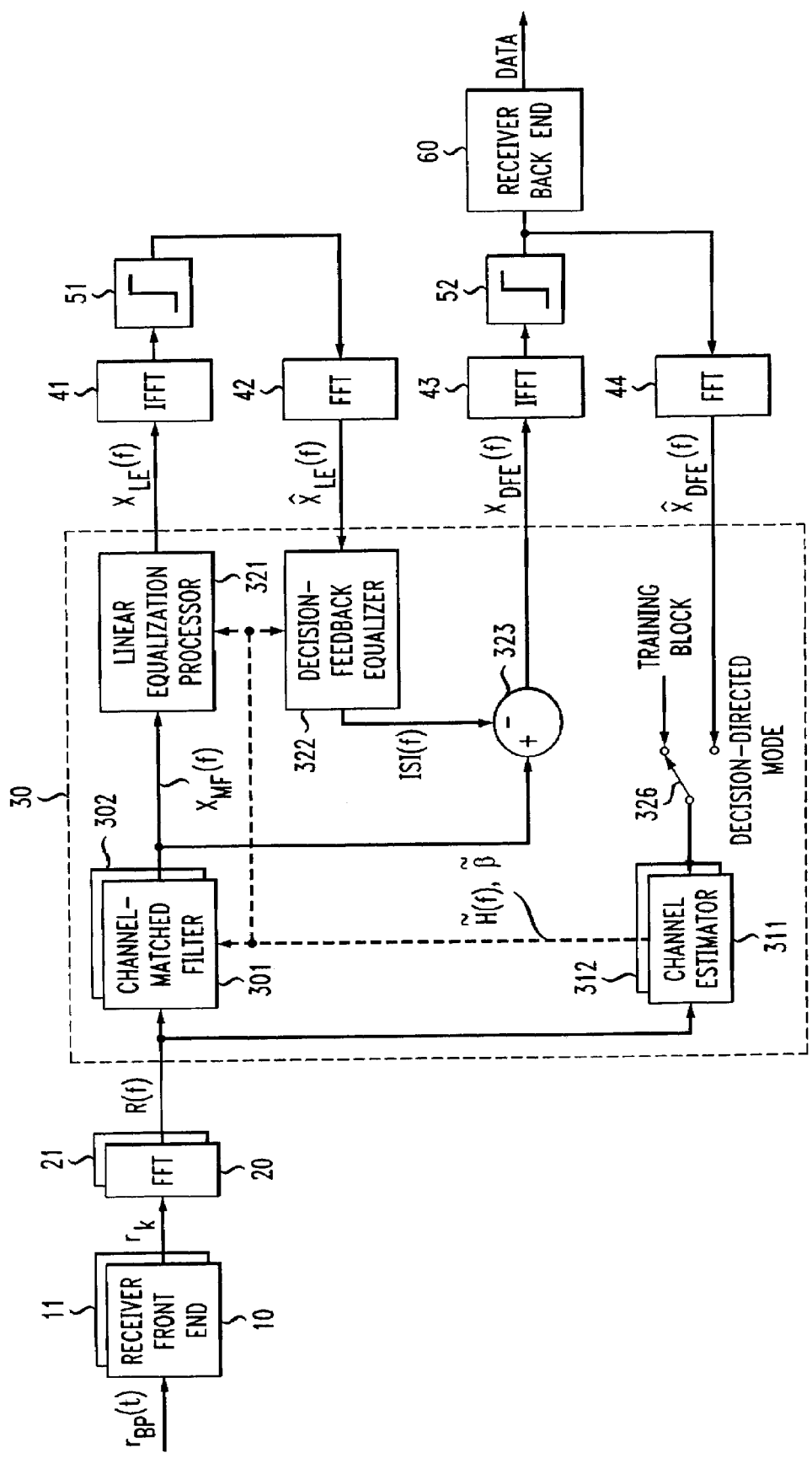
FIG. 1 shows a receiver for use in, for example, wireless applications, embodying the principles of the invention.

The receiver of FIG. 1 is illustratively a receiver in a cellular telephone or base station. It is assumed in the first instance that the receiver is not operating with diversity reception. That is, there is only one antenna and thus only one received signal.

A receiver front end 10 receives a radio-frequency signal $r_{BP}(t)$ from the channel. That signal illustratively carries PSK symbols representing baseband data. The channel, and the characteristics of the signal itself, are such that the received signal contains a significant amount of intersymbol interference. Front end 10 performs such conventional processing as automatic gain control, demodulation and sampling, so as to provide blocks of time domain samples of the received signal to fast Fourier transform (FFT) block 20. Illustratively the sampling is such as to provide two samples per symbol interval, each block thus comprising 2N samples $r_k$ for k=0, 1, ... 2N−1. The use of 2N samples rather than N samples takes account of the fact that the channel is not an ideal one. FFT processor 20 operates on the current received block $r_k$ to generate, for each such block, a discrete frequency-domain representation thereof R(f) comprising N frequency domain samples. The mapping from 2N input samples to N output samples can be carried out using the technique disclosed in co-pending, commonly assigned U.S. patent application Ser. No. 09/204,256, filed Dec. 3, 1998 and entitled "Adaptive Frequency Domain Equalizer," hereby incorporated by reference. Each set of frequency domain samples is applied to frequency domain processor 30 and, more particularly, to channel matched filter 301 thereof. The response of channel matched filter 301 is matched to the channel over which the signal has passed—that channel effectively including the physical, over-the-air signal path as well as receiver front end 10. The response of channel matched filter 301 is such as would maximize the signal-to-noise ratio of the received signal (strictly speaking, the signal-to-noise ratio of the time-domain version of the received signal) in the absence of intersymbol interference (ISI), thereby enhancing the effectiveness of the ISI cancellation carried out by decision-feedback equalizer 322 discussed below. The specific processing carried out in order to develop the response of channel-matched filter 301 is illustratively implemented in accordance with Eq. 6 below.

Each resulting block of filtered frequency domain samples, denoted $X_{MF}(f)$ is applied to linear equalization processor 321, which multiplies each frequency domain sample by a respective coefficient value. The ensemble of such coefficients defines processor 321's response. That response is such as to provide a frequency domain representation of the time domain sample block from which at least a portion of the intersymbol interference has been removed. The combination of channel-matched filter 301 and linear equalization processor 321 constitutes an overall linear equalizer. The specific processing carried out in order to develop the response of linear equalization processor 321 is illustratively implemented in accordance with Eqs. 9 and 32 below.

The output of linear equalization processor 321, $X_{LE}(f)$, is converted into the time domain samples by inverse fast Fourier transform (IFFT) block 41. The resulting time domain samples are sliced by slicer 51, resulting in a detected signal comprising tentative decisions as to the transmitted symbols. In alternative embodiments of the invention, one might think about supplanting the functions of slicer 51 (and slicer 52 discussed below) with a structure that utilizes so-called soft decisions such as would be provided by a Viterbi decoder.

The tentative decisions are thereupon subjected to decision feedback equalization in order to remove at least a portion of the residual ISI. In accordance with the principles of the invention, that decision feedback equalization is performed in the frequency domain. To that end, blocks of N symbol decisions output from slicer 51 are applied to FFT processor 42 so as to provide a frequency domain representation $\hat{X}_{LE}(f)$ of the linear-equalized and detected input signal block. Frequency domain processor 30 includes decision-feedback equalizer 322 which, like linear equalization processor 321, multiplies each frequency domain sample by a respective coefficient. The ensemble of such coefficients defines decision-feedback equalizer 322's response, which is such as to provide to one input of combiner 323 a frequency domain representation ISI(f) of the ISI in the output of the channel-matched filter. The specific processing carried out in order to develop the response of decision-feedback equalizer 322 is illustratively implemented in accordance with Eq. 17 below.

The other input of combiner 323 is the output signal of channel-matched filter 301, thereby providing at the output of combiner 323 a frequency-domain representation $X_{DFE}(f)$ of the input signal block $r_k$ but with a significant amount of the ISI now having been removed. IFFT processor 43 converts the combiner output back into the time domain. The resulting time domain samples are sliced by slicer 52, resulting in a signal comprising estimates of the transmitted symbols that, in general, will have fewer errors than the tentative decisions provided by slicer 51.

The symbol estimates generated by slicer 52 are applied to receiver back-end 60 which performs such functions as source decoding, descrambling, if necessary, and other functions required to recover the data bits represented by the transmitted symbols.

As described more fully hereinbelow, the aforementioned responses of channel-matched filter 301, linear equalization processor 321 and decision-feedback equalizer 322 are all derived from an estimate, $\tilde{H}(f)$, of the channel response H(f), the estimate being provided by channel estimator 311. The response of linear equalization processor 321 also depends on a parameter β, as described below, that is also provided by channel estimator 311. The specific processing carried out in order for channel estimator 311 to develop $\tilde{H}(f)$ and an estimate of β, $\tilde{\beta}$, is illustratively implemented in accordance with Eqs. 29–32 below. For the present it suffices to note that channel estimator 311 develops its estimates of the channel response in response to the frequency-domain representation R(f) of each input sample block $r_k$, provided by FFT processor 20, and a second input. As indicated symbolically by switch 326, that second input is either a training block used during start-up or the blocks of symbol estimates generated by slicer 52 during ongoing operation, this being a decision-directed, or tracking, mode of operation. To this end, the blocks of the symbol estimates generated by slicer 52 are transformed into the frequency domain by FFT processor 44, resulting in signal $\tilde{X}_{DFE}(f)$ and applied to channel estimator 311 during post-start-up operation of the receiver.

It would be theoretically possible to have FFT processor 44 provide a new output each time slicer 52 provides a new output, by adding the new output to the symbol block that is input to processor 44 while dropping off the oldest one. Such an approach would add greatly to the complexity of the receiver, however. Rather, in preferred embodiments of the invention, adaptation, or updating, of the channel estimate generated by channel estimator 311, and thus adaptation, or updating, of the responses of channel-matched filter 301, linear equalization processor 321 and decision-feedback equalizer 323 is carried out on a block basis. That is, it is only when a whole new block of symbol estimates—corresponding to a particular block $r_k$ of time domain input samples—is available at the output of slicer 51 that channel estimator 311 is caused to generate a new channel estimate. Adapting in this way, i.e., on a block basis, is potentially disadvantageous in that it renders the receiver more susceptible to channel estimation errors if, for example, the channel happens to be changing rapidly. However, it renders the receiver capable not only of the post-cursor ISI cancellation afforded by a standard DFE, but pre-cursor ISI cancellation, as well. This advantage can help offset any impact of increased channel estimation errors.

As discussed more fully hereinbelow, the overall error performance of a system that includes the receiver of FIG. 1 can be improved if diversity is built into the system by, for example, having M ($\geq$2) suitably spaced-apart receive antennas so as to have available at the receiver data signals that were transmitted over M multipath channels, those channels having corresponding sets of channel frequency responses that, at least ideally, are independent of one another. If this is desired, the receiver structure of FIG. 1 can be modified in a simple way. Rather than having just one receiver front end 10, one received signal FFT processor 20, one channel-matched filter 301, and one channel estimator 311, the receiver may employ a bank of M receiver front ends, M FFTs at the front end outputs, M matched filters, and M channel estimators. This is illustrated in the FIG. for the case of M=2, referred to as two-branch diversity, with the receiver thus further including receiver front end 11, FFT processor 21, channel-matched filter 302, and channel estimator 312. The signals received on the two antennas would be processed by a respective one of the receiver front ends 10 and 11, converted into the frequency domain by a respective one of FFT processors 20 and 21 and filtered by a respective one of channel-matched filters 301 and 302. The outputs of the two channel-matched filters would then be summed and the sum applied to linear equalization processor 321. The channel estimate used to adapt the channel-matched filters, linear equalization processors and decision feedback equalizers would be formed as a combination of the individual channel estimates developed by channel estimators 311 and 312, as described more fully hereinbelow.

The improved performance of a receiver embodying the principles of the invention over a frequency domain linear equalizer (as shown in the following section) is achieved with a relatively modest (something like 20%) increase in complexity (complexity being gauged by, for example, the number of complex operations per bit entailed by the processing). And as to the frequency domain DFE itself, it was observed that increasing the block size in the range N=256–4096 increased the per-bit complexity by only 12%, illustrating the modest growth of FDE complexity. Two-branch diversity (M=2) increased the processing complexity by 54%. In addition, using QPSK with M=2 increased the operations per bit by only 8% over the use of BPSK with M=1.

Figure 2:
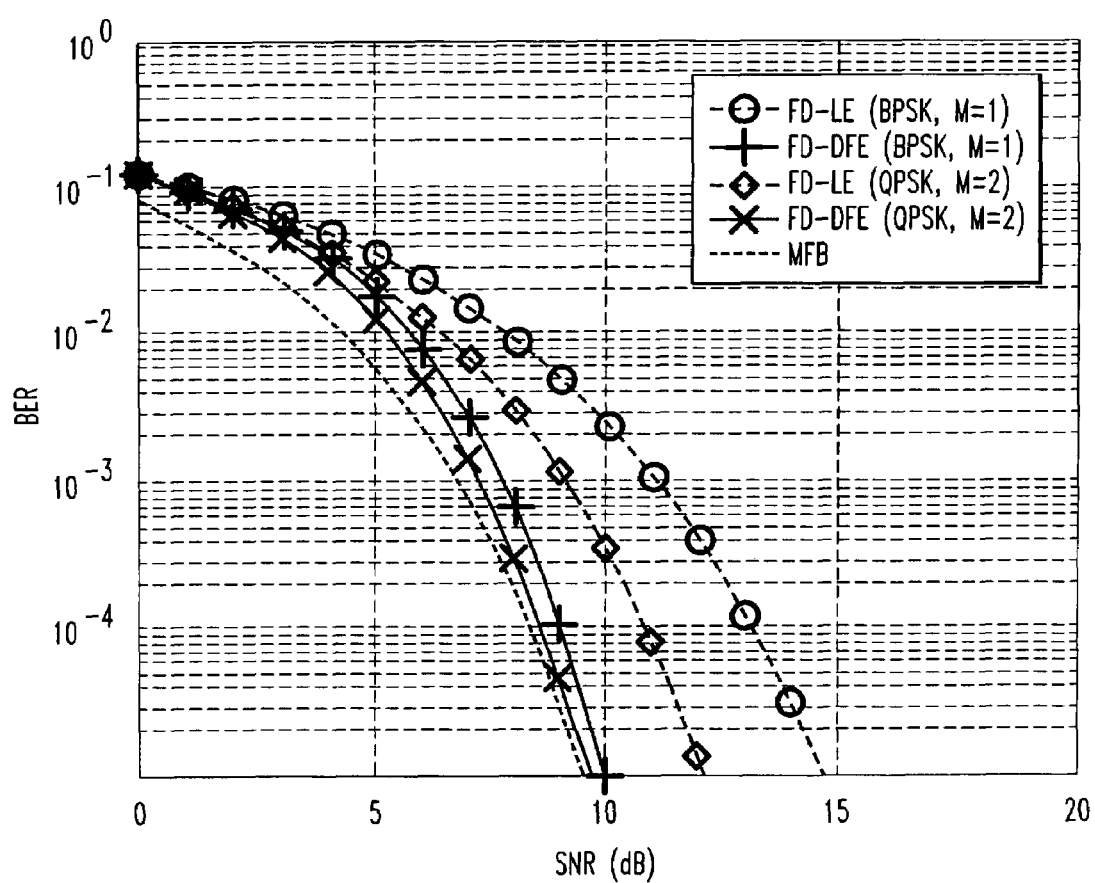
FIG. 2 shows the results of theoretical calculations comparing the performance of the receiver of FIG. 1 to the performance of a frequency domain linear equalizer under various assumed operating parameters.

FIG. 2 shows the results of theoretical calculations of the asymptotic performance of the prior frequency domain linear equalizer and frequency domain DFE for biphase shift keying (BPSK) over highly dispersive channels. These calculations assume an infinite-path channel. As seen, the frequency domain DFE offers a substantial performance gain over the frequency domain linear equalizer (2–5 dB gain in signal-to-noise ratio) for bit-error rate in the range $10^{-5}$ to $10^{-2}$. For increasing signal-to-noise ratio, the asymptotic bit-error rate performance of the frequency domain DFE converges, as expected, to the so-called matched filter bound (MFB), which represents the best possible performance of any equalizer. FIG. 2 also shows the two-branch diversity improvement of the asymptotic bit-error rate performance of frequency domain linear equalizer and frequency domain DFE with quadrature phase shift keying (QPSK) over highly dispersive channels. QPSK is an interesting choice for analyzing the receiver's performance because it yields the same MFB as that of BPSK with no diversity.

Simulation results confirm the general trends of the theoretical results, although with the performance of the frequency domain DFE being not quite as good as the theory predicts.

Table I shows channel estimation results for training versus tracking (i.e., decision-directed) modes and for two tracking mode block sizes (the longer block size improves noise averaging; the alternative is to average channel estimates over multiple blocks). The ranges shown are for increasing SNR (again, for bit-error rates in the range $10^{-5}$ to $10^{-2}$) and the degradation is approximately the same for both the frequency domain linear equalizer and the frequency domain DFE. Although the channel estimation algorithm that was used in carrying out the simulations exhibited some anomalies, it seems clear that with a slowly fading channel and sufficient noise averaging, the channel estimator should generally be able to contain the SNR degradation within 1 dB.

TABLE I

|  | No Diversity (M = 1) BPSK | Two-Branch Diversity (M = 2) BPSK or QPSK |
|---|---|---|
| Train (N = 1024) | 0.5–1.5 dB | 0.5–1 dB |
| Track (N = 1024) | 1–2 dB | ≈1 dB |
| Track (N = 4096) | ≈0.5 dB | <0.5 dB |

Theoretical Underpinnings and Analysis

A. Data Transmission

We assume uncorrelated data symbols from a BPSK or QPSK signal constellation. The data are broken into blocks of length N, which is some power of two; and a cyclic prefix of length L is appended to the beginning of each block, where L is equal to the expected maximum dispersion span. The current transmitted block, including the cyclic prefix, is denoted by $$\{z_k, k = -L, -L+1, \ldots, 0, 1, \ldots, N-1\} = \quad (1)$$

$$\{x_{N-L}, x_{N-L+1}, \ldots, x_{N-1}, x_0, x_1, \ldots, x_{N-1}\}$$

where $\{\chi_k, k=0, 1, N-1\}$ is the current transmitted block without the cyclic prefix; $\{\chi_k=\pm 1\}$ for BPSK and $\{\chi k=(\pm 1\pm j)/\sqrt{2}\}$ for QPSK. The symbols $\{z_k\}$ are transmitted over the channel at rate 1/T, and so the source data rate is $\xi/T$, where $\xi=N/(N+L)$ is the transmission efficiency. To simplify modeling and analysis, we assume sinc pulse shaping, i.e., the transmission bandwidth is W=1/T. Because excess bandwidth (e.g., cosine-rolloff pulse shaping) offers a kind of frequency diversity, we expect our results to be somewhat pessimistic. Later, we treat diversity channels explicitly to quantify such gains.

B. Channel Model

The current received block, after synchronization and gating (to strip off the cyclic prefix), is $\{\tau_k, k=0, 1, \ldots, N-1\}$. We assume a discrete complex baseband-equivalent channel model, such that $$r_k = \sum_{l=0}^{L} z_{k-l} h_l + n_k \qquad (2)$$

where $\{h_l, l=0, 1, \ldots, L\}$ is the discrete channel impulse response; and $\{\eta_k, k=0, 1, \ldots, N-1\}$ is additive noise. Both the channel gains $\{h_l\}$ and the noise samples $\{\eta_k\}$ are assumed to be uncorrelated, zero-mean complex Gaussian variables, with $E[|h_l|^2]=\overline{P}_{hl}$ and $E[|\eta_k|^2]=\beta$, where $\{\overline{P}_{hl}\}$ is the average power delay profile, $\beta=1/\text{SNR}$, and SNR is the ratio of average signal power to in-band noise power. Both the average delay profile and average signal power are taken over the multipath channel ensemble. The channel model effectively captures receiver gain control.

C. Receiver

In FIG. 1, the received signal is the sequence of gated received blocks, as described above. The FFT of the current received block is $$R(f)=F[\{r_k\}] \qquad (3)$$

where $F[\bullet]$ denotes an N-point FFT operation. Note that $R(f)$ is a set of N frequency-domain samples, where f denotes that sample index. Because of the cyclic property of $\{r_k\}$, we can write $$R(f)=X(f)H(f)+N(f) \qquad (4)$$

where $X(f)=F[\{\chi_k\}]$ is the current data block spectrum, $$H(f)=F[\{\{h_l\}, 0, 0, \ldots, 0\}] \qquad (5)$$

is the channel frequency response, and $N(f)=F[\{\eta_k\}]$ is the noise spectrum. The zero-padding in (5) ensures that $H(f)$ has N samples. In general, all these components of $R(f)$ are unknown. The receiver employs a channel estimator, shown in FIG. 1 and discussed later, to form estimates $\tilde{H}(f)$ and $\tilde{\beta}$, of the channel response, $H(f)$, and noise power, $\beta$, respectively. The purpose of the receiver, of course, is to use these estimates, in conjunction with $R(f)$, to reliably estimate $X(f)$, and in turn, $\{\chi_k\}$.

The channel-matched filter response is $\tilde{H}^*(f)$, and so its output is $$X_{MF}(f)=R(f)\tilde{H}^*(f) \qquad (6)$$

An important function for the equalizer formulations in the following sections is the magnitude-squared channel frequency response (again, unknown), $$P(f)=|H(f)|^2 \qquad (7)$$

and also its average over frequency, $$P_{av} = \frac{1}{N} \sum_f P(f) \qquad (8)$$

The receiver forms estimates $\tilde{P}(f)$ and $\tilde{P}_{av}$ of these two functions, based on the channel estimate $\tilde{H}(f)$.

We now describe the frequency-domain linear equalizer (FD-LE) and decision feedback equalizer (FD-DFE) processing blocks, and analyze their potential performances.

C.1 FD-LE

The response of the linear equalizer block is $$G(f)=[\tilde{P}(f)+\tilde{\beta}]^{-1} \qquad (9)$$

and its output is $$X_{LE}(F)=X_{MF}(f)G(f) \qquad (10)$$

This FD-LE output is inverse-transformed to get the symbol estimates $$\{\chi_{LE,k}\}=F^{-1}[X_{LE}(f)] \qquad (11)$$

where $F^{-1}[\bullet]$ denotes an N-point IFFT operation. The symbol estimates are then passed through a BPSK/QPSK detector to form the hard-decision estimates $\{\hat{\chi}_{LE,k}\}$.

We can also write the frequency-domain output of the FD-LE as $$X_{LE}(f) = X(f)\frac{H(f)\tilde{H}*(f)}{|\tilde{H}(f)|^2 + \tilde{\beta}} + N_{LE}(f) \qquad (12)$$

where $N_{LE}(f)=N(f)\tilde{H}^*(f)G(f)$ is the noise spectrum at the output of the equalizer. For $\tilde{H}(f) \approx H(f)$, $\tilde{\beta} \approx \beta$, and large SNR (small $\beta$), we thus get $X_{LE}(f) \approx X(f)$. Indeed, for perfect channel estimates, the FD-LE is a minimum mean-square error (MMSE) equalizer, where the MMSE is given by $$\varepsilon_{LE} = E[|x_{LE,k} - x_k|^2] = \frac{1}{N} \sum_f [P(f)/\beta + 1]^{-1} \qquad (13)$$

The receiver's bit-error-rate is well approximated by $$BER_{LE} \approx \frac{1}{2} erfc[\sqrt{SDR_{LE}/k_x}] \qquad (14)$$

where $k_\chi$ is the number of bits per symbol ($k_\chi=1$ bit/symbol for BPSK; $k_\chi=2$ bits/symbol for QPSK), and $SDR_{LE}=1/\epsilon_{LE}-1$ is the signal-to-distortion ratio (distortion is defined to include ISI and noise at the equalizer output). For highly-dispersive channels (large L) with many multipath components, more-over, the summation in (13) converges to its expected value over the channel ensemble. In such a case, the FD-LE's MMSE is well approximated by $$\epsilon_{LE} \approx \beta e^\beta E_1(\beta) \qquad (15)$$

where $E_1(\beta)=\int_\beta^\infty e^{-t}/t \, dt$ is a standard exponential integral. For large SNR, this result leads to $SDR_{LE} \approx \text{SNR}/\ln(\text{SNR})$, which illustrates the well-known vulnerability of linear equalizers to deep fades in the signal spectrum.

C.2 FD-DFE

In the following, we describe our proposed FD-DFE processing. For the purposes of the FD-DFE, the FD-LE hard-decisions are transformed back into the frequency-domain to get $$\hat{X}_{LE}(f)=F[\{\hat{\chi}_{LE,k}\}] \qquad (16)$$

The response of the decision feedback equalizer block is $$V(f)=\tilde{P}(f)-\tilde{P}_{av} \tag{17}$$

and the output of the summer following it is $$X_{DFE}(f)=[X_{MF}(f)-V(f)\hat{X}_{LE}(f)]/\tilde{P}_{av} \tag{18}$$

(Note: The $1/\tilde{P}_{av}$ scale factor shown in this equation is not shown in FIG. 1.) This output is, in turn, inverse-transformed to get the symbol estimates $$\{\chi_{DFE,k}\}=F^{-1}[X_{DFE}(f)] \tag{19}$$

which are then passed through a BPSK/QPSK detector to form the hard-decision estimates $\{\hat{\chi}_{DFE,k}\}$. The reasons behind the above proposed frequency domain operations will become evident in the following.

We can write the frequency-domain output of the FD-DFE summer as $$X_{DFE}(f)=X(f)+X(f)[H(f)\tilde{H}^*(f)-\tilde{P}(f)]/\tilde{P}_{av}-D(f)[\tilde{P}(f)/\tilde{P}_{av}-1]+N_{DFE}(f) \tag{20}$$

where $N_{DFE}(f)=N(f)\tilde{H}^*(f)/\tilde{P}_{av}$ is the noise spectrum at summer output and $D(f)=\hat{X}_{LE}(f)-X(f)$ is the FD-LE decision error spectrum. For $\tilde{H}(f)=H(f)$, we thus get $$X_{DFE}(f)=X(f)-D(f)[P(f)/P_{av}-1]+N_{DFE}(f) \tag{21}$$

The bit-error-rate of the FD-DFE is well approximated by $$BER_{DFE} \approx \frac{1}{2}erfc\left[\sqrt{SDR_{DFE}/k_x}\right] \tag{22}$$

where $SDR_{DFE}$ is the signal-to-distortion ratio at the FD-DFE output. In the case of perfect channel estimates, we have $SDR_{DFE}=1/\epsilon_{DFE}$, where $$\epsilon_{DFE} = E[|x_{DFE,k}-x_k|^2] \tag{23}$$

$$= \sigma_D^2 \left[\frac{1}{N}\sum_f (P(f)/P_{av}-1)^2\right] + \beta/P_{av}$$

is the corresponding mean-square error (MSE), and $$\sigma_D^2=E|D(f)|^2=E|\hat{\chi}_{LE,k}-\chi_k|^2=4BER_{LE} \tag{24}$$

is the mean-square decision error from the FD-LE. The result in (24) is based on the fact that if k out of $k_\chi$ bits are in error for some detected BPSK/QPSK symbol, the effective symbol decision error has a Euclidean distance of $2\sqrt{k/k_\chi}$, and thus a square decision error of $4k/k_\chi$. Over all symbols in a block, the mean-square decision error is thus $4BER_{LE}$.

If the FD-LE happened to make no decision errors in the current block, we would have $D(f)=0$ and, thus, $X_{DFE}(f)=X(f)+N_{DFE}(f)$—i.e., no frequency-selective distortion of the signal spectrum (perfect ISI cancellation) and matched-filtered noise. In this ideal case, we would get $SDR_{DFE}=SNR\,P_{av}$, which is equal to the so-called matched filter bound (MFB).

For highly-dispersive channels, the summation in (23) converges to its expected value over the channel ensemble (and $P_{av}$ converges to 1), and we get $$\epsilon_{DFE}\approx 4BER_{LE}+\beta \tag{25}$$

C.3 Diversity Reception

With ideal diversity, the data signal is transmitted over M (two or more) independent multipath channels, with the corresponding set of channel frequency responses denoted by $\{H_m(f)\}$. The FD-LE/DFE receiver structure is modified in a simple ways. Rather than having just one received signal FFT, one channel-matched filter, and one channel estimator, the receiver employs banks of M FFTs, M matched filters, and M channel estimators (see FIG. 1). The outputs of the matched filters are summed to form a modified $X_{MF}(f)$, and the combined signal is input to the equalizer processing. The function P(f) is redefined as $$P(f)=\sum_{m=1}^{M}|H_m(f)|^2 \tag{26}$$

and the rest of the FD-LE and FD-DFE processing remains the same (but accounting for this new definition of P(f)).

For the FD-LE, (13) still holds. In highly-dispersive channels, the BER performance of the FD-LE is now well approximated by (14) with the MMSE computed via the recursion $$\epsilon_{LE}^{(M)}\approx\beta/(M-1)[1-\epsilon_{LE}^{(M-1)}],\ M\geq 2 \tag{27}$$

(Note: Because we generally have $\epsilon_{LE}\ll 1$, we thus get $\epsilon_{LE}\approx\beta/(M-1)$, $M\geq 2$, which illustrates the benefit of diversity to linear equalization.)

For the FD-DFE, (20)–(23) still hold. In highly-dispersive channels, the BER performance of the FD-DFE is now well approximated by (22) with $$\epsilon_{DFE}=(4BER_{LE}+\beta)/M \tag{28}$$

Our channel estimator is based on frequency-domain MMSE estimation with brick-wall time-domain windowing, as described in the following. We assume that we know a priori the maximum dispersion span, L.

Assume, first, that the transmitted signal spectrum, X(f), is known, i.e., the estimator is operating in training mode. A noisy estimate of the channel frequency response is initially formed via the MMSE equation (similar to that of an MMSE equalizer)

$$\overline{H}_0(f)=\frac{X*(f)R(f)}{|X(f)|^2+\tilde{\beta}_0} \tag{29}$$

where $$\tilde{\beta}_0=\frac{1}{N}\sum_f |R(f)-X(f)|^2-1 \tag{30}$$

is an initial estimate of the in-band noise power, β (based on the premise that the average channel energy is close to unity). The smoothed estimate of the frequency response is then formed via $$\tilde{H}(f) = F[\{\tilde{h}_0, \tilde{h}_1, \ldots, \tilde{h}_L, 0, 0, \ldots, 0\}] \quad (31)$$

where $$\{\tilde{h}_l\} = F^{-1}[\tilde{H}_0(f)]$$

is the estimate of the discrete channel impulse response, including unwanted (noisy) components outside the expected dispersion span. The operation shown in (31) simply sets these unwanted values to zero (time-domain windowing). If multipath components did, in fact, exist outside the expected span, the accuracy of the channel frequency response estimate would be degraded.

Based on the estimate $\tilde{H}(f)$, the estimator computes $\tilde{P}(f)$ and $\tilde{P}_{av}$. The channel estimator then forms the estimate of β via $$\tilde{\beta} = \frac{1}{N^2} \sum_f |R(f)|^2 - \tilde{P}_{av} \quad (32)$$

Roughly speaking, the noise power parameter is estimated as the difference between the received energy and the channel energy (i.e., the transmitted energy is implicitly assumed to be unity). With diversity (M≧2), the channel estimator averages over diversity branches for the estimation of β in (30) and (32).

When the receiver does not have a training block X(f) available to it, it operates in tracking mode, whereby it uses a previous data spectrum estimate $\hat{X}(f)$ and corresponding received block R(f).

To control numerical errors, we fine-tune the channel estimation algorithm by: a) excluding small values of |X(f)| in the $\tilde{\beta}_0$ calculation; b) limiting the minimum values of $\tilde{\beta}_0$ and $\tilde{\beta}$; and c) limiting the maximum magnitude of $\tilde{H}(f)$. Although the algorithm is quite robust, more research could be done to improve it, or even to simplify it.

The foregoing merely illustrates the principles of the invention and many variations are possible. For example, the particular modulation techniques, bit rates, and other parameters that characterize the embodiments shown and described herein are all merely illustrative. The invention is not limited to wireless systems but, rather, can be used in a variety of applications in which equalization is appropriate. Moreover, arrangements embodying the principles of the invention may operate on signals having additional aspects not explicitly described herein, such as trellis or convolutional coding.

All examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The block diagrams herein represent conceptual views of illustrative circuitry embodying the principles of the invention. Thus the functions of the various elements shown in the FIGS. may be provided through the use of dedicated hardware as well as hardware capable of executing software. The functions of those various elements may be implemented by, for example, digital signal processor (DSP) hardware, network combiner, application specific integrated circuit (ASIC), field programmable gate array (FPGA), read-only memory (ROM) for storing software, random access memory (RAM), and non-volatile storage. Indeed, it is envisioned that the processing by which the principles of the invention are realized will probably be implemented not by discrete circuit elements but by program code. Again, it is envisioned that the functions of such elements would be realized via appropriate program code. Thus such terms as "circuitry" and "processor" as used herein are intended to refer to arrangements of any of these or other types capable of performing the function(s) described.

Nor it is required that individual elements that provide identical functions to one another, such as the disclosed FFTs and IFFTs, be replicated in a practical realization of the invention. Rather, a program module implementing any particular such function would be executed whenever the function in question was needed to be performed.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

It will thus be appreciated that those skilled in the art will be able to devise various arrangements which, although not explicitly described or shown herein, embody the principles of the invention and are included within their spirit and scope.

The invention claimed is:

1. A method for processing a received time domain signal representing a sequence of channel symbols, the method comprising matched-channel filtering a frequency domain representation R(f) of the received signal to generate a frequency domain representation $X_{MF}(f)$, linear equalizing said frequency domain representation $X_{MF}(f)$ to generate a linear equalized frequency domain representation $X_{LE}(f)$, combining said frequency domain representation $X_{MF}(f)$ of the received signal with a frequency domain estimate ISI(f) of intersymbol interference in said representation $X_{MF}(f)$ to generate an ISI-mitigated frequency-domain representation $X_{DFE}(f)$ of said received signal, said estimate ISI(f) being a function of a frequency domain representation $\hat{X}_{LE}(f)$ of tentative decisions as to the channel symbols, said tentative decisions being formed as a function of said representation $X_{LE}(f)$, and generating final decisions as to the channel symbols as a function of said representation $X_{DFE}(f)$.

2. The method of claim 1 further comprising
generating an estimate of the characteristics of a channel from which said received signal was received, said estimate being generated in response to a frequency domain representation $\hat{X}_{DFE}(f)$ of said final decisions and a frequency domain representation of said received signal, and
using said estimate to update parameters used to perform at least one of said matched-channel filtering, said linear equalizing and the generating of said intersymbol interference estimate ISI(f).

3. The method of claim 2 further comprising
generating an estimate $\tilde{\beta}$ of the in-band noise power $\beta$ in said received signal, said estimate $\tilde{\beta}$ being generated in response to said frequency domain representation $\hat{X}_{DFE}(f)$ of said final decisions and a frequency domain representation of said received signal, and
using said estimate $\tilde{\beta}$ to update at least one of said parameters used to perform said linear equalizing.

4. The method of claim 1 wherein said received time domain signal includes at least two time domain signals representing said sequence of channel symbols and received over different channels.

5. A method comprising
receiving at least first and second time domain signals over respective channels, said first and second time domain signals representing the same sequence of channel symbols,
matched-channel filtering respective frequency domain representations of the first and second received time domain signals to generate first and second matched-channel-filtered signals,
generating a frequency domain representation $X_{MF}(f)$ that is a function of the first and second matched-channel-filtered signals,
linear equalizing said frequency domain representation $X_{MF}(f)$ to generate a linear equalized frequency domain representation $X_{LE}(f)$,
combining said frequency domain representation $X_{MF}(f)$ of the received signal with a frequency domain estimate ISI(f) of intersymbol interference in said representation $X_{MF}(f)$ to generate an ISI-mitigated frequency-domain representation $X_{DFE}(f)$ of said received signal, said estimate ISI(f) being a function of a frequency domain representation $\hat{X}_{LE}(f)$ of tentative decisions as to the channel symbols, said tentative decisions being formed as a function of said representation $X_{LE}(f)$, and
generating final decisions as to the channel symbols as a function of said representation $X_{DFE}(f)$.

6. The method of claim 5 further comprising
generating estimates of the characteristics of the channels from which said received signals were received, each of said estimates being generated as a function of a frequency domain representation $\hat{X}_{DFE}(f)$ of said final decisions and of frequency domain representation of a respective one of the received signals, and
using said estimates to update parameters used to perform at least one of said matched-channel filtering, said linear equalizing and the generating of said intersymbol interference estimate ISI(f).

7. The method of claim 6 further comprising
generating an estimate $\tilde{\beta}$ of the in-band noise power $\beta$ in said received signals, said estimate $\tilde{\beta}$ being generated in response to said frequency domain representation $\hat{X}_{DFE}(f)$ of said final decisions, and
using said estimate $\tilde{\beta}$ to update at least one of said parameters used to perform said linear equalizing.

8. Apparatus for processing a time block of a signal received from a channel, said received signal block representing a sequence of channel symbols, the apparatus comprising
means for filtering said received signal block with a filter response that is matched to said channel to generate a filtered version of said received signal block,
means for generating in the frequency domain a linear equalized version of said filtered version of said received signal block,
means for forming tentative decisions as to the channel symbols based on said linear equalized version of said received signal block, and
means for generating in the frequency domain a decision-feedback-equalized version of said received signal block that is a function of said received signal block and of a frequency domain estimate of the intersymbol interference in said received signal block, said estimate being formed in response to a frequency domain representation of said tentative decisions.

9. The apparatus of claim 8 wherein said filter response is such as would maximize the signal-to-noise ratio of the received signal block in the absence of intersymbol interference.

10. The apparatus of claim 8 further comprising
means for forming final decisions as to said channel symbols based on the decision-feedback-equalized version of said received signal block.

11. The apparatus of claim 10 further comprising means for updating said filter response as a function of an estimate of the characteristics of said channel, said channel estimate being formed as a function of a frequency domain representation of said final decisions and a frequency domain representation of said received signal block.

12. The apparatus of claim 10 further comprising means for updating parameters used to generate at least one of said linear equalized version of said received signal block and said decision-feedback-equalized version of said received signal block as a function of an estimate of the characteristics of said channel, said channel estimate being formed as a function of a frequency domain representation of said final decisions and a frequency domain representation of said received signal block.

* * * * *